United States Patent

Hayashi et al.

[11] Patent Number: 5,829,254
[45] Date of Patent: Nov. 3, 1998

[54] SUPERCHARGING PRESSURE CONTROL DEVICE

[75] Inventors: Takashi Hayashi, Susono; Shigetaka Tanaka, Mishima, both of Japan

[73] Assignee: Toyota Jidosha Kabushiki Kaisha, Toyota, Japan

[21] Appl. No.: 773,285

[22] Filed: Dec. 24, 1996

[30] Foreign Application Priority Data

Dec. 27, 1995 [JP] Japan ................................. 7-341828

[51] Int. Cl.$^6$ ................................................. F02B 37/12
[52] U.S. Cl. ................................................. 60/602
[58] Field of Search ................... 60/600–603; 123/564

[56] References Cited

U.S. PATENT DOCUMENTS

| | | | |
|---|---|---|---|
| 4,849,897 | 7/1989 | Ciccarone | 60/602 |
| 5,363,652 | 11/1994 | Tanaka et al. | |
| 5,440,879 | 8/1995 | Dellora | 60/602 |
| 5,605,044 | 2/1997 | Zimmer et al. | 60/602 |

FOREIGN PATENT DOCUMENTS

| | | | |
|---|---|---|---|
| 84037 | 7/1983 | European Pat. Off. | 60/602 |
| 57-52638 | 3/1982 | Japan | 60/602 |
| 59-160028 | 9/1984 | Japan | 60/602 |
| A-6-10686 | 1/1994 | Japan . | |

OTHER PUBLICATIONS

Bent, Ralph D. et al., "Aircraft Powerplants" Fifth Edition, pp.160–162, 1978.

"Maintenance Notes (1), Aircraft Engines", (first printing of first version was published on Jul. 10, 1981 by Japan Aircraft Engineering Association).

*Primary Examiner*—Michael Koczo
*Attorney, Agent, or Firm*—Oliff & Berridge, PLC

[57] ABSTRACT

According to the supercharging pressure control device of the present invention, the speed of the turbocharger of an internal combustion engine for an aircraft is controlled by adjusting the opening of a waste gate valve. In the control device of the internal combustion engine, an inlet air flow rate of a turbocharger compressor, an inlet air pressure, an inlet air temperature, and an air-fuel ratio of the internal combustion engine are detected by respective corresponding sensors. Under these conditions, a pressure ratio of the compressor where the turbocharger is operated near the maximum allowable speed is calculated. At the same time, the waste gate valve opening is controlled so as to obtain the calculated pressure ratio. By this, the turbocharger is constantly operated near the maximum allowable speed. Therefore it becomes possible to operate the internal combustion engine with the maximum supercharging pressure under the operating conditions.

6 Claims, 7 Drawing Sheets

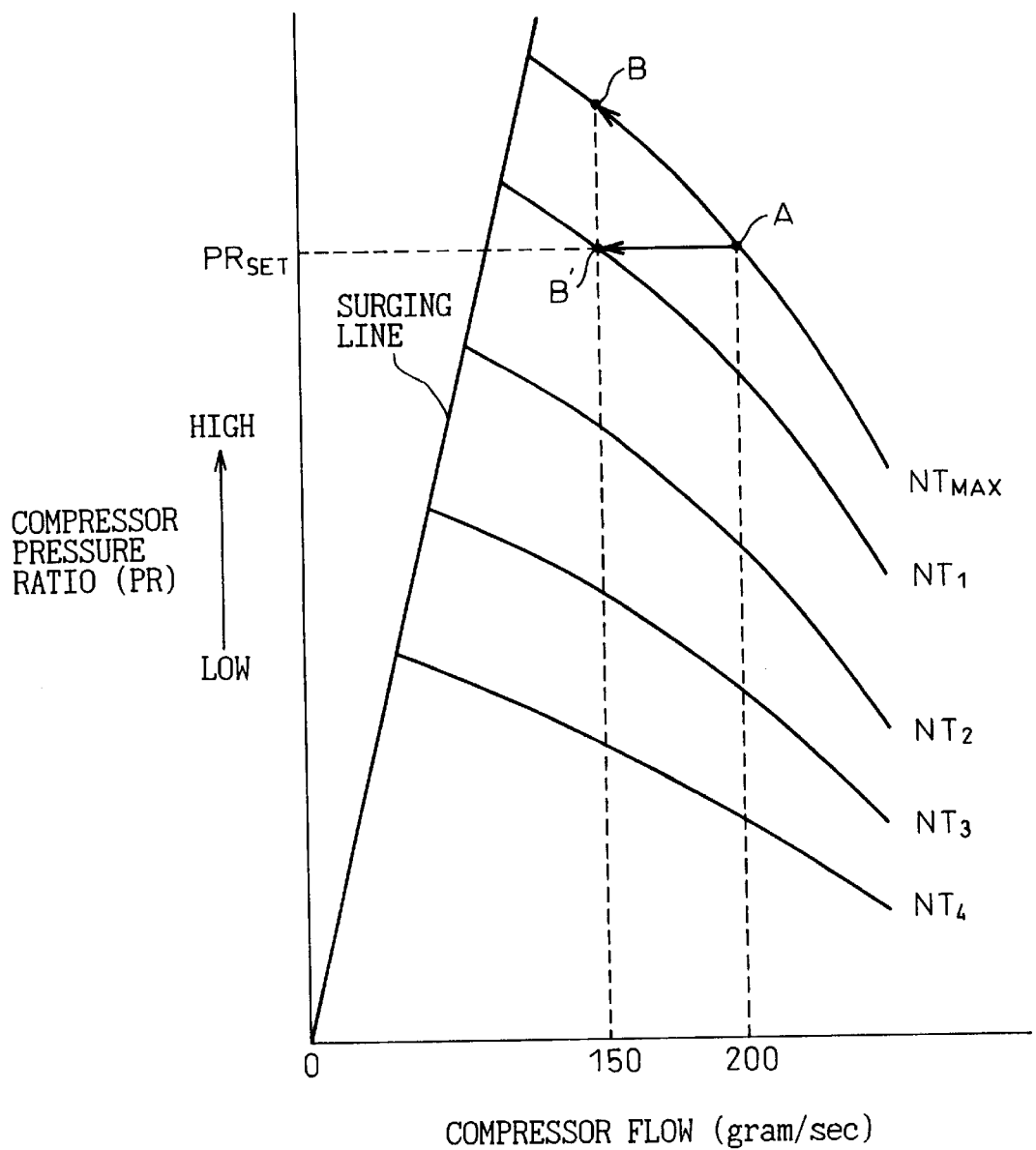

SUPERCHARGING PRESSURE CONTROL DEVICE

BACKGROUND OF THE INVENTION

1. Field of the Invention

The present invention relates to a supercharging pressure control device of a supercharger.

2. Description of the Related Art

In general, in an internal combustion engine for an aircraft which is equipped with a supercharger, the condition of the inlet air of the supercharger compressor changes according to the flying altitude. Therefore, the supercharging pressure is usually controlled in accordance with the flying altitude.

In the control of the supercharging pressure of a supercharged internal combustion engine for aircraft, generally a combination of control for holding the compressor outlet pressure constant (constant control of deck pressure) and control for holding the pressure ratio of the compressor outlet air and inlet air constant (constant control of pressure ratio) is used.

A device performing this type of supercharging pressure control is disclosed in, for example, "My Maintenance Notes", Aircraft Engines (first printing of first version was published on Jul. 10, 1981 by Japan Aircraft Engineering Association).

The supercharging pressure control device disclosed in the above document is provided with an absolute pressure controller for restricting the compressor outlet air pressure (hereinafter referred to as the "deck pressure") to the predetermined maximum pressure during a period when the aircraft is flying at an altitude not more than a critical altitude and a pressure ratio controller for restricting the pressure ratio between the deck pressure and a compressor inlet pressure (atmospheric air pressure) to a predetermined value or less during a period when the aircraft is flying at an altitude higher than the critical altitude.

Here, the predetermined maximum pressure of the deck pressure is the maximum allowable pressure determined from the durability of the internal combustion engine etc., and the maximum output of the engine is only obtained under the condition that the deck pressure becomes this maximum allowable pressure. Accordingly, by constantly controlling the deck pressure to the maximum pressure, it becomes possible for the engine to operate under the maximum output condition. If the flying altitude of the aircraft becomes high, however, the atmospheric pressure (compressor inlet pressure) is lowered in accordance with the altitude. Therefore, in order to control the deck pressure to the maximum pressure, it is necessary to increase the compression ratio of the supercharger compressor (pressure ratio between the outlet air and the inlet air) in accordance with an increase in the flying altitude. Namely, it is necessary to raise the speed of the supercharger in order to obtain the maximum pressure. For this reason, if the deck pressure is constantly controlled to the maximum allowable pressure irrespective of the flying altitude, the supercharger speed becomes higher as the flying altitude becomes higher, and eventually it exceeds the maximum allowable speed of the supercharger and causes an over-speed condition. Therefore, in order to prevent the over-speed condition of the supercharger at a certain constant altitude or higher, it is necessary to set the deck pressure at a value lower than the maximum allowable pressure. Namely, if the flying altitude is more than a certain altitude, there is a limit to the maximum deck pressure derived from the allowable speed of the supercharger and, therefore, the maximum allowable deck pressure cannot be obtained at an altitude higher than a certain altitude.

The critical altitude means the maximum altitude at which the maximum allowable deck pressure of the supercharger can be obtained. In other words, the critical altitude is the maximum altitude at which a supercharged internal combustion engine equipped for aircraft use can be operated at the maximum output.

The supercharging pressure control device of the above publication constantly controls the deck pressure so that the following two conditions are simultaneously true: (1) the deck pressure does not exceed the maximum allowable pressure, and (2) the compressor pressure ratio does not exceed a predetermined constant pressure ratio (for example the pressure ratio at the maximum allowable speed of the supercharger). Namely, at the critical altitude or lower, even if the supercharger speed rises, the deck pressure reaches the maximum allowable pressure before the supercharger reaches the maximum allowable speed, therefore the absolute pressure controller operates before the pressure ratio controller operates and the deck pressure is controlled to the maximum allowable pressure (constant value). Further, at an altitude exceeding the critical altitude, even if the supercharger speed reaches the maximum allowable speed, the deck pressure does not reach the maximum allowable pressure, therefore the pressure ratio controller starts operating before the absolute pressure controller operates, and the pressure ratio of the compressor is now controlled to be constant.

For this reason, in the supercharging pressure control device of the above publication, at the critical altitude or lower, constant deck pressure control is carried out, and at the altitude exceeding the critical altitude, constant pressure ratio control is carried out.

However, if the pressure ratio of the compressor is controlled to a constant value after reaching the critical altitude, as in the device of the above document, there sometimes occurs a case where the performances of the engine cannot be utilized to the maximum at a flying altitude above the critical altitude. Namely, the relationship between the speed of the turbocharger and the pressure ratio of the compressor is not always constant, but is greatly influenced by the operating condition of the turbocharger.

For example, in an engine for an aircraft, the operating air-fuel ratio of the engine (air-fuel ratio of the air-fuel mixture supplied to the engine combustion chamber) is set to a richer side than the stoichiometric air-fuel ratio in order, in an operation in which the engine maximum output is required such as a take off or landing, to prevent the overheating of elements around the combustion chamber by cooling these elements with the fuel. On the other hand, when the aircraft enters into the normal flying condition, the operating air-fuel ratio of the engine is set to the leaner side than the stoichiometric air-fuel ratio to reduce the fuel consumption. Namely, in an internal combustion engine for an aircraft, the operating air-fuel ratio is switched between rich and lean. However, when the operating air-fuel ratio of the engine is switched to the rich side, as will be explained in detail later, even if the pressure ratio of the compressor is controlled to be constant, the turbocharger speed rises. Further, when the intake air amount (weight flow ratio) of the compressor is increased, even if the compressor pressure ratio is maintained constant, the speed of the turbocharger rises. Further, similarly, when the compressor intake air pressure rises, the turbocharger speed rises if the compressor pressure ratio is maintained constant. Further, even in a case where the intake air temperature of the compressor rises, if the compressor pressure ratio is maintained constant, the turbocharger speed will rise.

Accordingly, where control is carried out for maintaining the compressor pressure ratio constant, it is necessary to set the compressor pressure ratio with a margin of safety with consideration of all of the above conditions so that the speed of the turbocharger will not become more than the maximum allowable speed even under a condition where the speed becomes highest. For this reason, in an actual operation, if the compressor pressure ratio is controlled to a constant value, the turbocharger speed becomes considerably lower than the allowable speed in some cases. This means that, in these cases, the pressure ratio actually can be raised further by increasing the turbocharger speed and, therefore, the performance of the engine cannot be utilized to the maximum extent in these cases. This problem can be solved if the supercharging pressure is controlled in accordance with the actual speed of the turbocharger in such a manner that the actual speed of the turbocharger is always near the maximum allowable speed. However, this type of control requires a speed sensor for detecting the turbocharger speed, and new provision of the speed sensor in the turbocharger causes a rise of the cost of the device per se and, at the same time, causes the complication of the device, for example a necessity of adding a fail-safe mechanism at the time trouble occurs in the sensor, and thus is not preferred.

SUMMARY OF THE INVENTION

In view of the problems in the related art as set forth above, the object of the present invention is to provide a supercharging pressure control device with which a supercharger is operated near the maximum allowable speed irrespective of the change of the supercharger operating condition without disposing a speed sensor in the supercharger, thereby enabling the utilization of the performance of the engine up to the maximum limit.

This object is achieved by a supercharging pressure control device, according to the present invention, which comprises a supercharger having a compressor for raising the pressure of air, pressure ratio controlling means for controlling the pressure ratio of an outlet air and an inlet air of the compressor of the supercharger so that the pressure ratio becomes a predetermined pressure ratio setting, supercharging parameter detecting means for detecting a supercharging parameter representative of an operating condition of the supercharger, and pressure ratio setting changing means for changing the pressure ratio setting of the pressure ratio control means in accordance with the value of the detected supercharging parameter.

In the supercharger pressure control device according to the present invention, the pressure ratio of the compressor outlet air and inlet air is not controlled to a constant value, but the setting of the pressure ratio is changed in accordance with the operating condition of the supercharger. Therefore, it becomes possible to suppress the reduction of the speed due to a change of the operating condition of the supercharger.

According to one aspect of the present invention, the supercharging parameter detecting means detects at least an intake air amount of the compressor as the supercharger parameter.

Namely, in this aspect of the invention, the compressor intake air amount, which exerts an influence upon the compressor pressure ratio and the speed, is used as the supercharging parameter, therefore it becomes possible to set an adequate pressure ratio in accordance with the change of the supercharger operating condition and suppress the reduction of the speed of the supercharger.

According to another aspect of the present invention, the supercharging parameter detecting means detects at least one of the intake air pressure and intake air temperature of the compressor as the supercharging parameter.

In this aspect of the invention, the supercharger operating condition parameters exerting an influence upon the pressure ratio of the compressor and the speed, such as the compressor intake air pressure and the intake air temperature, are used as the supercharging parameter, therefore it becomes possible to set an adequate pressure ratio in accordance with the change of the supercharger operating condition and suppress the reduction of the speed of the supercharger.

According to another aspect of the present invention, the supercharger is driven by an internal combustion engine and raises the pressure of the intake air of the internal combustion engine and wherein the supercharging parameter detecting means detects an engine operating condition parameter representative of the operating condition of the internal combustion engine as the supercharging parameter.

Namely, in this aspect of the invention, when the supercharging pressure of the supercharger of the internal combustion engine is controlled, the engine operating condition parameters representing the operating condition of the internal combustion engine are used as the supercharging parameters. In the supercharger of the internal combustion engine, there is a close relationship between the supercharger operating condition and the operating condition of the internal combustion engine per se, therefore by controlling the pressure ratio by using the engine operating condition parameters, it becomes possible to set an adequate pressure ratio based on the values of the engine operating condition parameters without directly detecting the operating condition parameters of the supercharger and thereby suppress the reduction of the speed of the supercharger.

According to another aspect of the present invention, the supercharger is an exhaust gas turbocharger and the engine operating condition parameter includes at least one of the speed of the internal combustion engine and the engine operating air-fuel ratio.

Namely, in this aspect of the invention, at least one of the engine speed and engine operating air-fuel ratio, which particularly have a great influence upon the pressure ratio of the supercharger compressor is used as the engine operating condition parameter. Therefore, it becomes possible to set an adequate pressure ratio based on the value of the engine operating condition parameter without directly detecting the operating condition parameter of the supercharger and suppress the reduction of the speed of the supercharger.

According to another aspect of the present invention, the supercharging pressure control device further comprises inlet air pressure detecting means for detecting the compressor inlet air pressure and prohibiting means for prohibiting the pressure ratio controlling means from controlling the pressure ratio of the supercharger when the inlet air pressure exceeds a predetermined value.

Namely, in the invention of claim 6, when the pressure ratio is controlled by, for example, by the pressure ratio controlling means, and if the compressor outlet pressure will exceed the maximum allowable pressure due to, for example, increase in the compressor inlet pressure, the pressure ratio control as set forth above is prohibited. By this, it becomes possible to control the compressor outlet air pressure to the maximum allowable pressure in this region, therefore the outlet pressure of the compressor can be raised up to the maximum limit in this region.

BRIEF DESCRIPTION OF THE DRAWINGS

The present invention will be better understood from the description as set forth hereinafter, with reference to the accompanying drawings in which:

FIG. 4 shows the general performance curves of a turbocharger compressor;

DESCRIPTION OF THE PREFERRED EMBODIMENT

Figure 1:
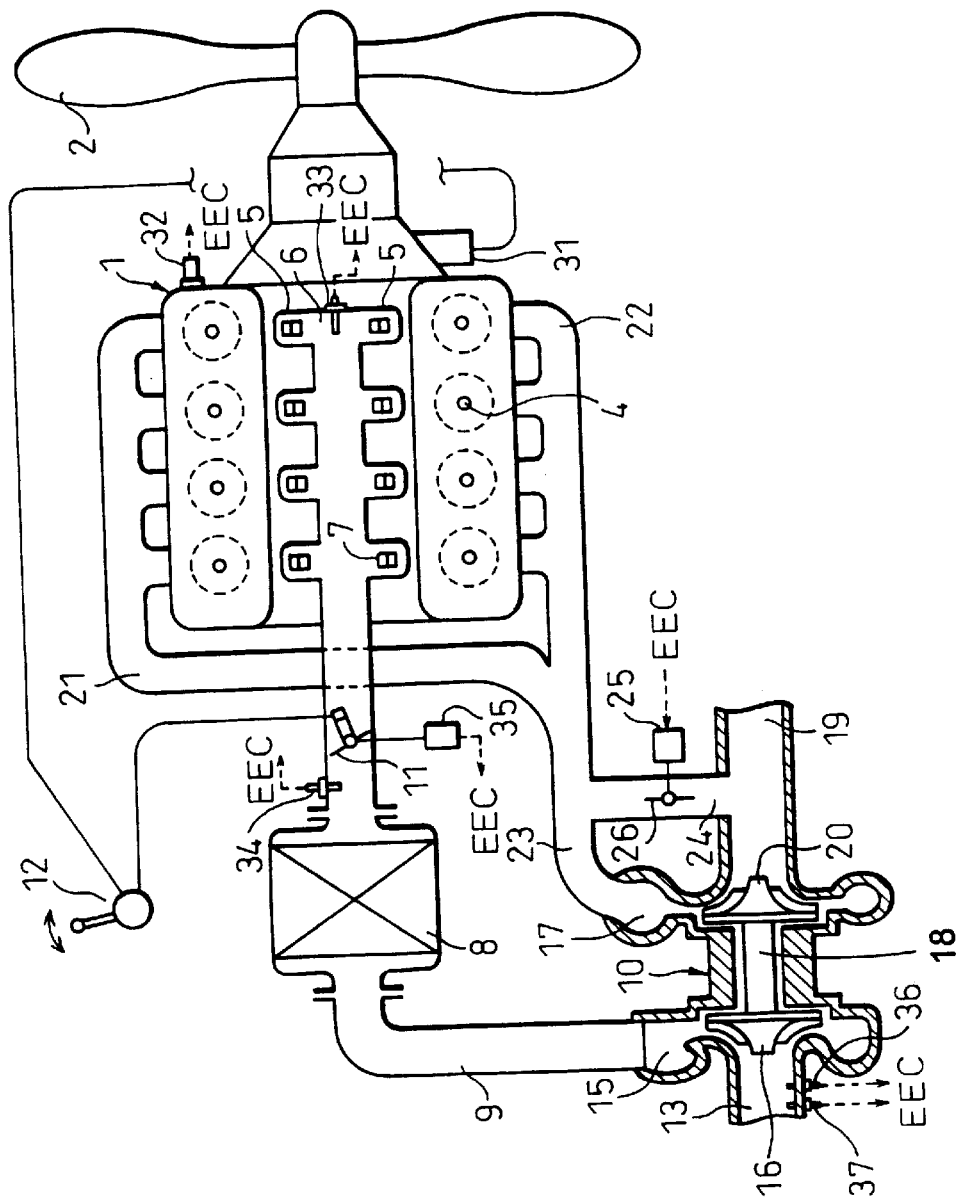
FIG. 1 schematically illustrates the general configuration of an embodiment of the present invention when applied to an aircraft engine.

FIG. 1 is a view of the general configuration of an embodiment of a supercharging pressure control device of the present invention when applied to a supercharged internal combustion engine for aircraft. In FIG. 1, reference numeral 1 designates an internal combustion engine and 2 designates a propeller driven by the engine 1. In this embodiment, a multi-cylinder (in FIG. 1, a V type 8-cylinder) 4-cycle reciprocating engine is used for the engine 1. The reference numeral 5 in FIG. 1 designates an intake manifold connecting the intake ports of the cylinders of the engine 1 to a common intake duct 6. Near the connecting portions of the intake ports of the cylinders of the intake manifold are arranged fuel injectors 7 for injecting pressurized fuel to the intake ports of the cylinders.

In FIG. 1, numeral 11 shows a throttle valve arranged in the intake duct 6 downstream of an intercooler 8. The throttle valve 11 is connected to a power lever 12 provided at the pilot's seat and assumes a degree of opening according to the amount of operation of the power lever 12. Further, 8 shows the intercooler provided on the intake duct 6, 10 an exhaust turbocharger, and 9 an intake duct connecting the discharge port 15 of a compressor 16 of the turbocharger 10 and the intercooler 8.

Further, in FIG. 1, reference numeral 21 and 22 show exhaust manifolds connecting the exhaust ports of the cylinders of the banks at the two sides of the engine 1 with a common exhaust pipe 23. The common exhaust pipe 23 is connected to the exhaust inlet 17 of the exhaust turbine 20 of the turbocharger 10.

The turbocharger 10 in this embodiment is comprised of a centrifugal compressor 16 and a centrifugal exhaust turbine 20 for driving the compressor 16. The intake air of the engine 1 flows from the air cleaner (not shown) through the air inlet pipe 13 to the compressor 16. In the compressor 16, the air is raised in pressure to become supercharged air and is supplied to the intercooler 8 from the intake duct 9. After being cooled at the intercooler 8, it passes through the intake duct 6, throttle valve 11, and intake manifold 5 to be supplied to the cylinders of the engine 1.

Further, the exhaust gas of the engine 1 passes from the exhaust manifolds 21 and 22 through the exhaust pipe 23 and flows from the exhaust inlet 17 to the turbine 20. This exhaust gas drives the rotation of the turbine and the compressor 16 connected to the same, then is discharged from the exhaust outlet pipe 19.

Further, in this embodiment, an exhaust bypass passage 24 is provided for connecting the exhaust pipe 23 and the exhaust outlet pipe 19 of the turbine 20. In the exhaust bypass passage 24 is provided a wastegate valve 26 for controlling the flow rate of the exhaust gas bypassing the exhaust turbine 20 from the bypass passage 24 and flowing to the exhaust outlet pipe 19. When the wastegate valve (WGV) 26 is fully closed, the entire amount of the exhaust gas from the engine 1 flows to the turbine 20, so the speed of the turbocharger 10 rises and the outlet pressure of the compressor 16 becomes high (the outlet pressure of the compressor (i.e., the supercharging pressure) is hereinafter referred to as "deck pressure"). On the other hand, when the WGV 26 opens, part of the exhaust gas of the engine 1 bypasses the turbine 20 and flows out to the exhaust outlet pipe 19, so the flow rate of the exhaust gas passing through the turbine 20 drops. Therefore, the speed of the turbocharger 10 falls and the deck pressure falls in accordance with the degree of opening of the WGV 26. That is, by adjusting the degree of opening of the WGV 26, it is possible to make the deck pressure of the engine 1 and the speed of the turbocharger 10 fall to a desired level.

In the embodiment of FIG. 1, the WGV 26 is driven by an actuator 25 comprised of a DC servomotor. The actuator 25 operates in accordance with an opening command signal from a later mentioned electrical engine controller (EEC) 30 (FIG. 2) and controls the WGV 26 to a degree of opening in accordance with the opening command signal from the EEC 30. Note that as the actuator 25, it is also possible to use an actuator other than a DC servomotor so long as it can drive the WGV 26 to the degree of opening in accordance with the opening command signal from the EEC 30. For example, it is also possible to use a stepping motor or an electrical/hydraulic pressure type actuator etc.

In this embodiment, the propeller 2 driven by the engine 1 is a variable pitch propeller, and a speed governor 31 for controlling the propeller pitch of the propeller 2 is provided. In this embodiment, the propeller governor 31 is a centrifugal type governor and is connected to a drive shaft of the propeller through a rotation transmission shaft (not shown). The propeller governor 31 acts to adjust the propeller pitch so that the engine speed (propeller speed) matches the speed setting. That is, when the propeller speed becomes higher than a speed setting, the governor 31 makes the propeller pitch increase and increases the power absorbed by the propeller so as to cause the engine speed to drop. Further, when the propeller speed becomes lower than the speed setting, the governor 31 reduces the propeller pitch and causes the power absorbed by the propeller to decrease so as to cause the engine speed to increase. By this, the propeller speed (engine speed) is controlled to match with the speed setting of the propeller governor 31. In this embodiment, the speed governor 31 and the throttle valve 11 are connected to a common power lever 12 via respective control cables. Therefore, by operating this single power lever 12, it is possible to simultaneously control both of the degree of opening of the throttle valve 11 (engine output) and the engine speed (pitch of propeller 2). In this embodiment, the control cables for controlling the throttle valve 11 and governor 31 are connected to the power lever through cams having shapes determined in accordance with the aerodynamic characteristics of the aircraft body. Therefore, the characteristics of change of the amounts of operation of the throttle valve 11 and governor 31 with respect to the amount of operation of the power lever 12 can be set to suitable characteristics to provide the optimal engine output/speed characteristics matching with the aerodynamic characteristics of the aircraft body.

Figure 2:
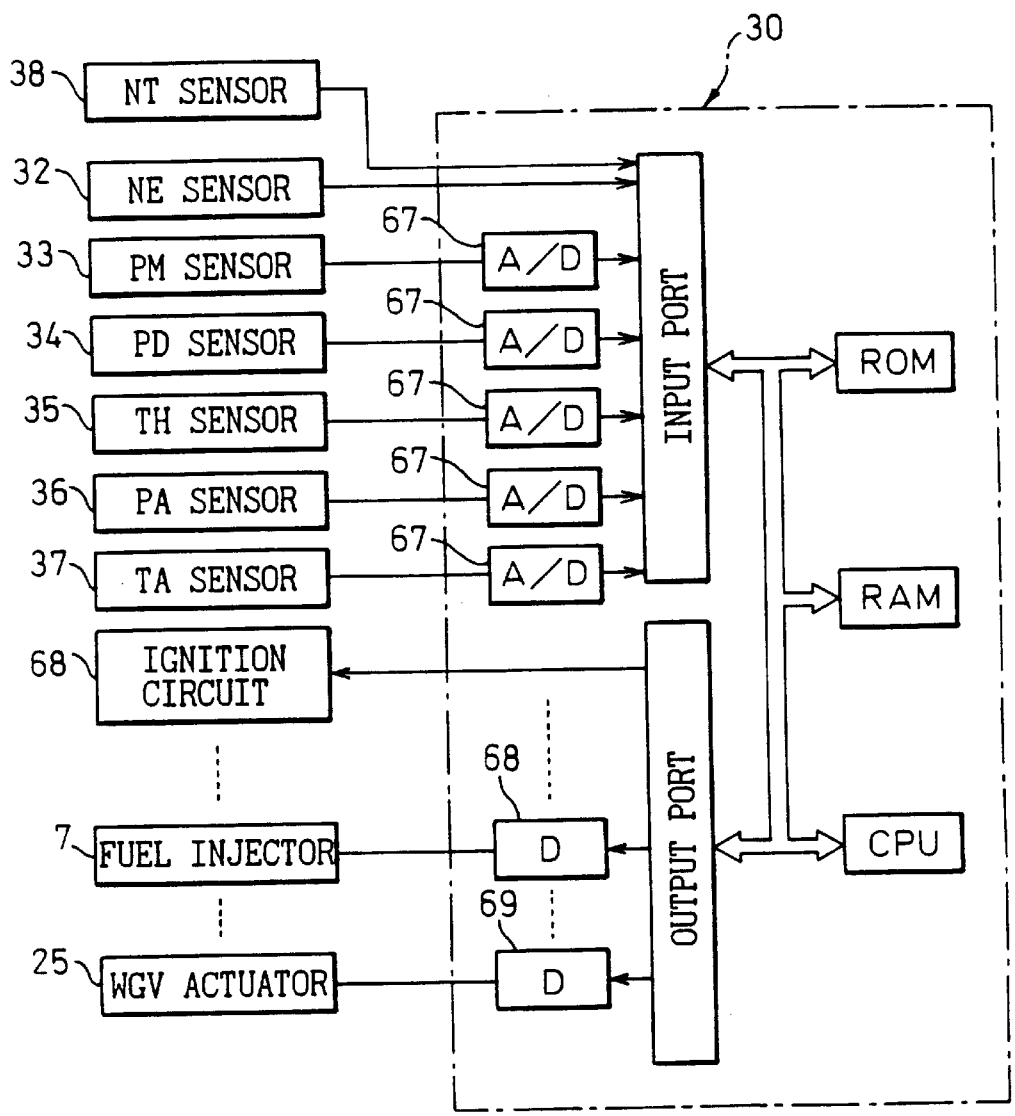
FIG. 2 is a block diagram showing the general configuration of a control device of the embodiment of FIG. 1.

FIG. 2 is a view of the configuration of the EEC (electrical engine controller) 30 for controlling the engine 1. As shown in FIG. 2, the EEC 30 in this embodiment is comprised of a microcomputer of a known configuration including a RAM, ROM, CPU, input port, and output port connected with each other by a bi-directional bus. In this embodiment, the EEC 30 performs the control of the fuel injection of the engine 1, the control of the ignition timing, and other basic control and also the later mentioned supercharging pressure control. For these controls, pulse signals having frequencies proportional to the engine speed NE and the turbocharger speed NT are supplied to the input port of the EEC 30 from an NE sensor 32 provided on a crankshaft (not shown) of the engine 1 and an NT sensor 38 provided on a driving shaft 18 connecting the compressor 16 to the turbine 18, respectively. The CPU of the EEC 30 calculates the engine speed NE and the turbocharger speed NT based on these pulse signals and uses these speeds for the various control operations mentioned later.

Further, a voltage signal, from a PM sensor 33 disposed in the intake duct 6 downstream of the throttle valve 11, which is proportional to the absolute pressure PM in the intake duct 6, and a voltage signal from a PD sensor 34, provided in the intake duct 6 upstream of the throttle valve 11, which is proportional to the supercharging pressure (deck pressure) PD (absolute pressure) of the turbocharger 10 are fed to the input port of the EEC 30 through the AD converters 67. Further, the input port of the EEC 30 receives as input through the AD converters 67 a voltage signal corresponding to the degree of opening TH of the throttle valve 11 from a TH sensor 35, a voltage signal corresponding to the atmospheric temperature TA from the TA sensor 37 disposed on the air inlet pipe 13 of the compressor, and a voltage signal corresponding to the atmospheric pressure PA from a PA sensor 36 disposed on the air inlet pipe 13.

The output port of the EEC 30 is connected to the spark plugs 4 and fuel injectors 7 of the cylinders of the engine 1 through an ignition circuit 68 and drive circuit 69 and controls ignition timing of the engine 1 and the amount and timing of fuel injection. In this embodiment, the EEC 30 determines the optimal fuel injection amount, injection timing, and ignition timing from the intake pressure PM and engine speed NE detected by the PM sensor 33 and NE sensor 32 based on a numerical table stored in the ROM of EEC 30 in advance. Then, the EEC 30 injects fuel from the fuel injectors 7 and ignites spark plugs 4 in accordance with the determined values.

Further, the output port of the EEC 30 is connected to an actuator 25 of the WGV 26 through the drive circuit 69 and controls the degree of opening of the WGV 26 to control the supercharging pressure as explained below.

Next, the supercharging pressure control performed in the embodiment of FIG. 1 will be explained.

In the present embodiment, the EEC 30 adjusts the opening of the WGV 26 and controls the flow rate of the exhaust gas passing through the turbine 20 so that the pressure ratio PR (PR=PD/PA) calculated from the deck pressure PD detected by the PD sensor 34 and the inlet air pressure PA of the compressor 16 detected by the PA sensor 36 becomes the pressure ratio set in advance. Further, the value of the pressure ratio PR is set in accordance with the operating condition of the turbocharger 10 in such a manner that the turbocharger is operated at a speed near the maximum allowable speed in all operating conditions.

First, before explaining the details of the control of the supercharging pressure in the present embodiment, an explanation will be made of the object of the control of the supercharging pressure in the present embodiment by using FIGS. 3(A), 3(B) and 3(C).

Figure 3A:
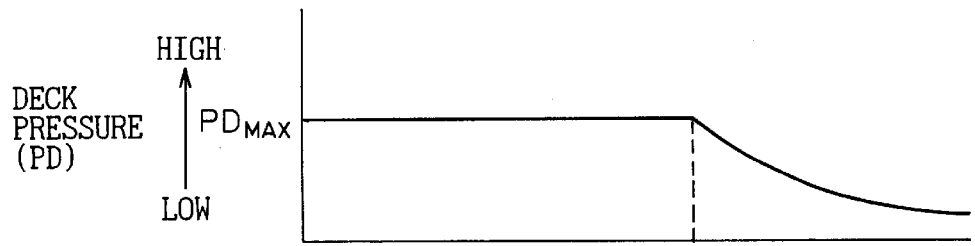
FIGS. 3(A), 3(B) and 3(C) are diagrams explaining the change in the turbocharger speed due to the flying altitude when controlling the deck pressure and the pressure ratio of the turbocharger to a constant value.
Figure 3B:
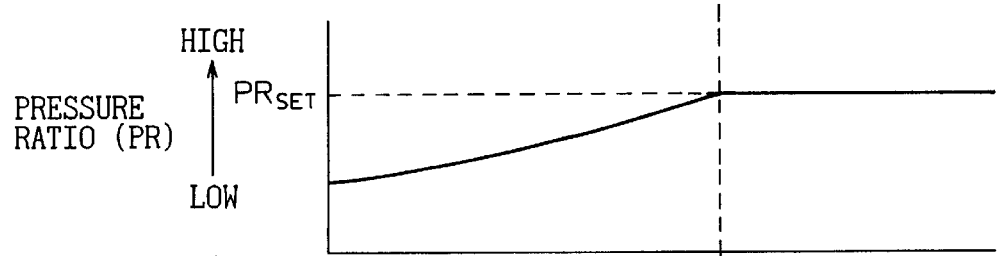
Figure 3C:
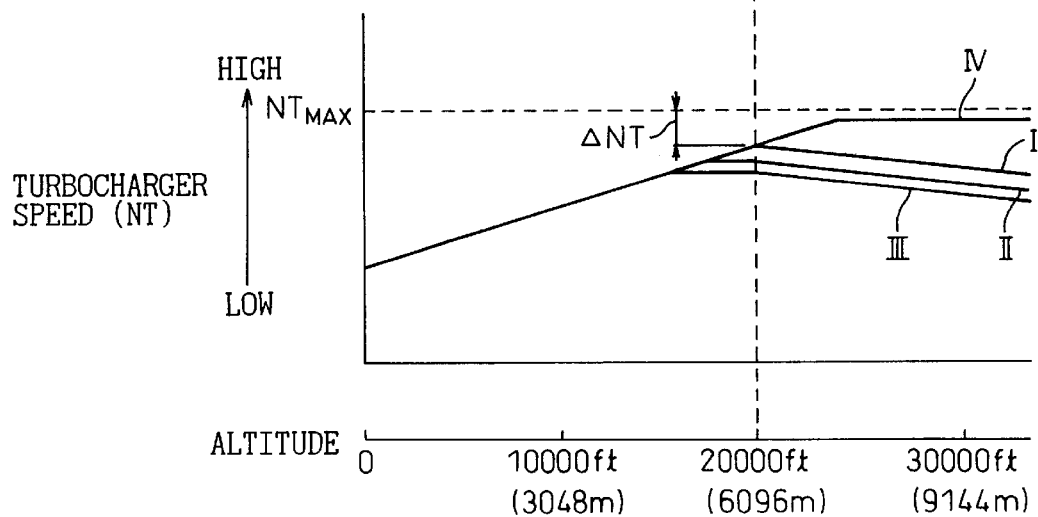

FIGS. 3(A), 3(B) and 3(C) show a change of the turbocharger speed where control is carried out in such a manner that the deck pressure is controlled to a constant pressure when the altitude is less than or equal to the critical altitude, and that the pressure ratio is controlled to a constant value when the altitude is higher than the critical altitude, as in the above related art. FIGS. 3(A) and 3(B) show the change of the deck pressure PD and the pressure ratio PR, respectively, according to the altitude in this case. As shown in FIGS. 3(A) and 3(B), the control is performed so that the deck pressure PD becomes a constant up to the critical altitude (example of FIG. 3 shows a case where the critical altitude exists near 20,000 feet ($\approx$6096 m) (FIG. 3(A)). During a period where the constant deck pressure control is carried out, the pressure ratio PR increases together with the altitude due to the reduction of the atmospheric pressure PA by the increase of the altitude (FIG. 3(B)). Further, when the pressure ratio PR is increased and reaches the setting which was set in advance at the critical altitude, the constant pressure ratio control starts and the pressure ratio PR of the turbocharger is now controlled to a constant value $PR_{SFT}$ (FIG. 3(B)). By this, at the critical altitude or higher, the deck pressure PD is lowered along with an increase of the altitude due to the lowering of the atmospheric pressure.

FIG. 3(C) shows a change of the turbocharger speed where the deck pressure control of FIG. 3(A) and FIG. 3(B) is carried out. Here, the curves of FIG. 3(C) indicate the change of speed according to the operating condition of the turbocharger where the deck pressure is controlled under the condition of FIG. 3(A) and FIG. 3(B), and a curve I of FIG. 3(C) shows the change of the speed of the turbocharger according to the altitude where the engine speed is maintained constant under a rich air-fuel ratio WOT (wide open throttle) condition and shows a case where the intake air temperature and intake pressure of the engine are maintained generally constant. In this case, the turbocharger speed substantially uniformly rises up to the critical altitude. In the region above the critical altitude where the constant pressure ratio control is carried out, it is lowered along with an increase of the altitude. The reason why the turbocharger speed is lowered together with the altitude in the region above the critical altitude will be mentioned later.

The curve II of FIG. 3(C) shows the turbocharger speed where the speed of the engine is maintained constant under a lean air-fuel ratio WOT condition in which the air-fuel ratio is switched to lean, so the engine output becomes lower than the case of the curve I and an energy of exhaust supplied to the turbocharger is lowered. Therefore the speed of the turbocharger is lowered as a whole in comparison with the case of the curve I.

Further, the curve III shows a case where the atmospheric temperature (compressor intake air temperature) is lowered in a condition of the curve II. As will be mentioned later, when the atmospheric temperature is lowered, the turbocharger speed for obtaining the same pressure ratio is lowered, and in the region above the critical altitude at which the constant pressure ratio control is carried out, the speed of the turbocharger will be further lowered in comparison with the curve II.

$NT_{MAX}$ of FIG. 3(C) shows the maximum allowable speed determined from the durability of the turbocharger. As mentioned before, the pressure ratio setting where the constant pressure ratio control of the turbocharger is carried out ($PR_{SET}$ of FIG. 3(B)) is set while giving a margin of safety so that the maximum speed reached by the turbocharger becomes lower than $NT_{MAX}$ by exactly a certain constant amount (for example an amount indicated by $\Delta NT$ in FIG. 3(C)) even if the turbocharger is operated under a condition where the speed rises most (for example, if it is operated under the condition of curve I in FIG. 3(C)).

For this reason, when the flying altitude further rises as shown in curve I of FIG. 3(C), the difference between the maximum allowable speed $NT_{MAX}$ and the actual turbocharger speed becomes large. Accordingly, when the constant pressure ratio control is carried out, the speed of the turbocharger is limited unnecessarily when the flying altitude increases. Therefore, the difference between the true engine maximum output and the engine maximum output which can be actually used becomes larger as the flying altitude increases.

Further, where the engine air-fuel ratio and the atmospheric air condition of the compressor inlet etc. change (curves II and III of FIG. 3), the reduction of the turbocharger speed becomes even larger if the constant pressure ratio control is carried out. Therefore a difference between the engine maximum output which can be originally utilized and the engine maximum output which can be actually utilized becomes even larger.

In the present embodiment, the compressor pressure ratio is not always controlled to be constant at the critical altitude or higher as mentioned above, but the supercharging pressure is controlled for setting the pressure ratio of the compressor at an adequate value in accordance with the operating condition of the turbocharger. Namely, according to the present embodiment, as indicated by a curve IV in FIG. 3(C), irrespective of the change of the turbocharger operating condition, the turbocharger speed after reaching the critical altitude is maintained at a speed slightly lower than the maximum allowable speed $NT_{MAX}$. For this reason, it becomes possible to utilize the engine maximum output in each operating condition for an actual operation, and this means an improvement of the degree of freedom of control of the aircraft.

In this way, in order to constantly maintain the turbocharger speed at a value in the vicinity of the maximum allowable speed $NT_{MAX}$ irrespective of the change of the turbocharger operating condition, there arises a need for setting the pressure ratio PR in each operating condition by considering the influence of the change of the turbocharger operating condition exerted upon the turbocharger speed NT and the pressure ratio. Therefore, an explanation will be made of the influence of the change of the compressor operating condition exerted upon the turbocharger speed NT and the pressure ratio PR by using FIG. 4.

FIG. 4 shows examples of the general performance curves of a turbocharger compressor. In FIG. 4, the vertical axis indicates the pressure ratio PR (PR=PD/PA) of the compressor, and the horizontal axis indicates the weight flow ratio of the compressor intake air (gram/sec). The curves in the figure are performance curves for different speeds of the turbocharger. In the figure, the curve indicated by $NT_{MAX}$ is a performance curve at the maximum allowable speed of the turbocharger, while $NT_1, NT_2, NT_3, \ldots$ indicate the performance curves where the speed is lowered from the maximum allowable speed. The relationship of the speeds $NT_1, NT_2, NT_3, \ldots$ becomes $NT_{MAX} > NT_1 > NT_2 > \ldots$ Note that the performance curve of FIG. 4 is shown for a case where the compressor inlet air pressure and temperature are constant.

First, an explanation will be made of the influence of the compressor flow rate exerted upon the pressure ratio.

For example, assume that the compressor flow rate is lowered from a condition where the turbocharger is operated at the point A on the curve of the maximum allowable speed $NT_{MAX}$. In this case, when the turbocharger speed is maintained constant, the compressor pressure ratio PR rises and the operating point of the compressor moves from, for example, a point A to a point B. When it is assumed that constant control of the compressor pressure ratio is carried out, when the compressor flow rate is lowered as described above, the operating point shifts from the point A to a point B', and the turbocharger speed is lowered from $NT_{MAX}$ to $NT_1$. Accordingly, in order to maintain the turbocharger speed constant, it is necessary to increase the setting of the compressor pressure ratio along with a reduction in the compressor flow rate.

On the other hand, where the engine operating air-fuel ratio is switched from the rich air-fuel ratio to the lean air-fuel ratio as mentioned before, due to the lowering of the exhaust energy, the turbocharger speed is lowered. In this case, the air flow rate is also lowered together with the lowering of the speed of the turbocharger, therefore where the turbocharger is operated at the point A of FIG. 4, if the pressure ratio is maintained constant, the operating point shifts from the point A to the point B'. Accordingly, in order to prevent the lowering of the turbocharger speed in this case, it is necessary to increase the pressure ratio and shift the operating point to the point B ($NT_{MAX}$) similar to the above description. Namely, where the engine operating air-fuel ratio is switched from rich to lean, in order to maintain the turbocharger speed constant, it is necessary to increase the setting of the pressure ratio of the compressor.

Figure 5:
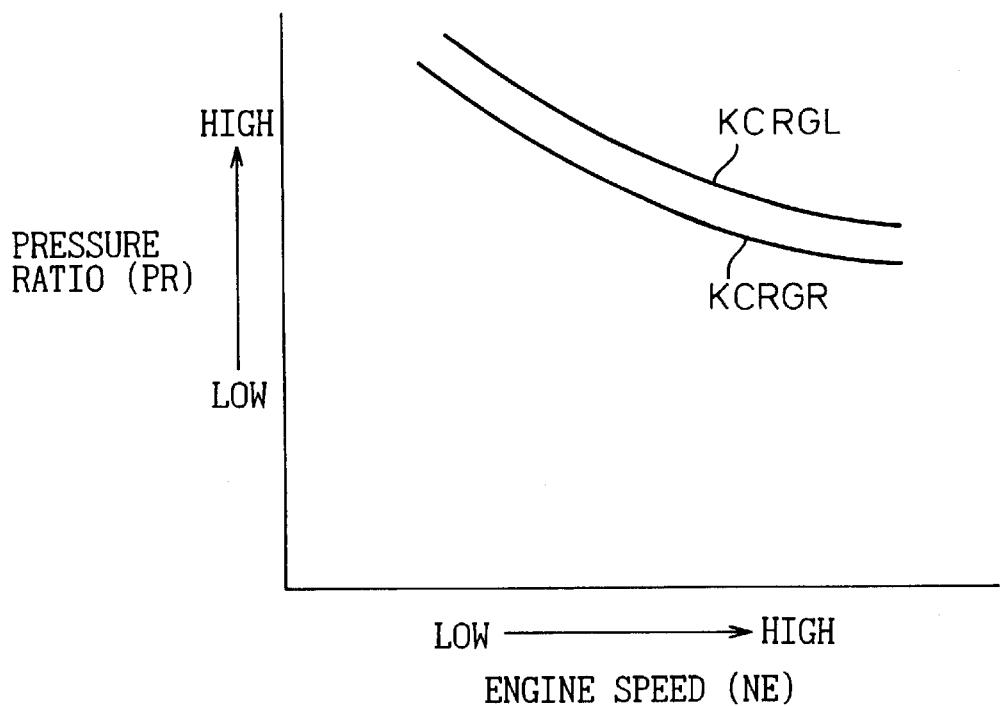
FIG. 5 is a diagram explaining the change of a compressor pressure ratio due to a change of a compressor air flow rate and an engine operating air-fuel ratio.

FIG. 5 is a view of the change of the pressure ratio accompanying a change of the compressor air flow rate (weight flow rate) and the engine operating air-fuel ratio where the turbocharger speed is maintained constant (for example $NT_{MAX}$). In the present embodiment, substantially the entire amount of air passing through the compressor is taken into the engine, therefore the air flow rate of the compressor is substantially equal to the engine intake air amount. Further, the engine intake air amount (weight flow rate) is a function of the engine speed and the engine load (for example, throttle valve opening TH and the intake pipe pressure PM), therefore if the engine speed and the load are determined, the engine intake air amount is fixedly determined. On the other hand, in the present embodiment, as mentioned before, the engine load (throttle valve opening) and the engine speed (governor setting) are simultaneously controlled by a single power lever, therefore if the engine speed is determined, the engine load is simultaneously determined. Accordingly, in the present embodiment, if the engine speed is determined, the engine intake air amount is fixedly determined. Therefore, in the present embodiment, the compressor air flow rate is detected by using the engine speed without actually measuring the air flow rate of the compressor. For this reason, also the horizontal axis of FIG. 5 represents the engine speed NE in place of the actual compressor air flow rate. Further, the curve KCRGR of FIG. 5 shows the change of the pressure ratio where the engine is operated with a rich air-fuel ratio, and KCRGL shows the change of the pressure ratio where the engine is operated with a lean air-fuel ratio. As shown in FIG. 5, where the turbocharger speed NT is maintained constant, the lower the engine speed NE, the higher the compressor pressure ratio. Further, where the engine is operated with a lean air-fuel ratio, the pressure ratio is increased even at the same turbocharger speed and same engine speed in comparison with the case of the rich air-fuel ratio operation.

Next, a case where the compressor inlet air pressure is lowered will be considered. In this case, when it is assumed that the volume flow rate of air under the compressor inlet condition (hereinafter, referred to as a "actual flow rate") is constant, the weight flow rate of the compressor is reduced due to the lowering of the inlet air pressure.

When temporarily assuming that the inlet air pressure of the compressor becomes three-quarters of the pressure of the case of the performance curve, even if the actual air flow rates under the compressor inlet condition are the same, the air weight flow rate becomes three-quarters of that before the change. For this reason, for example, if the compressor inlet air pressure is lowered to three-quarters from a condition where the turbocharger is operated at the point A of the speed $NT_{MAX}$ (weight flow rate: 200 grams/sec) before the air temperature change, the weight flow rate after the change becomes 150 grams/sec, and if the pressure ratio is maintained constant, the operating point will move from the point A to the point B' in FIG. 4, and the turbocharger speed will be lowered to $NT_1$. Accordingly, also in this case,also in this case, in order to maintain the speed at $NT_{MAX}$, it is necessary to raise the setting of the pressure ratio similar to the above description and shift the operating point after the pressure change to the point B. Namely, in order to maintain the turbocharger speed constant, it is necessary to increase the setting of the compressor pressure ratio as the inlet air pressure of the compressor is lowered.

Figure 6:
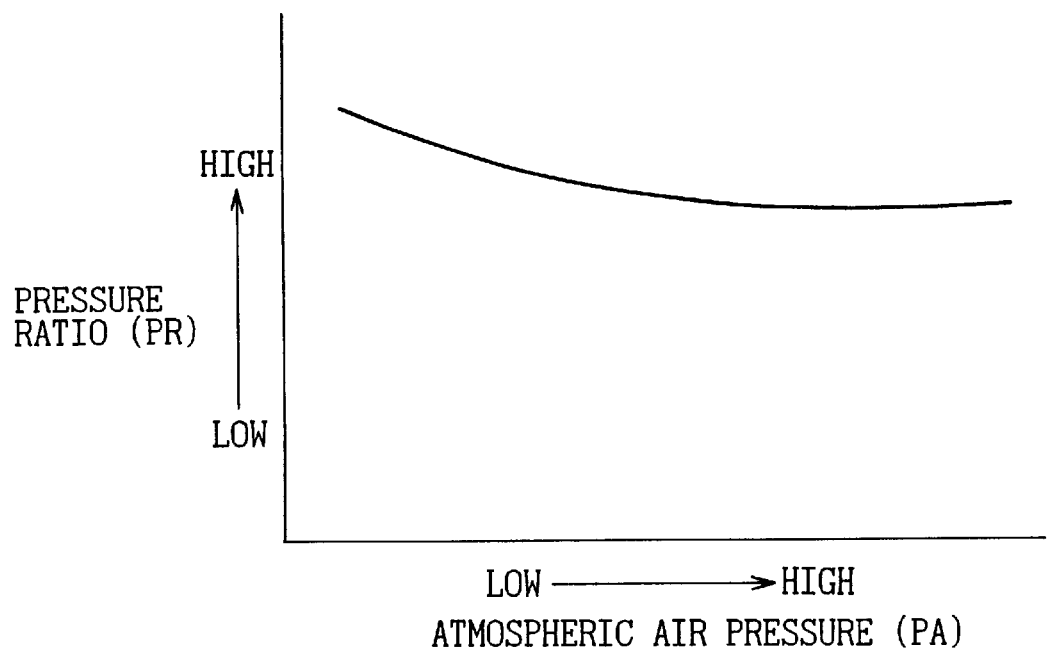
FIG. 6 is a diagram explaining the change of the compressor pressure ratio due to a change of the compressor inlet air pressure.

FIG. 6 is a view of the change of the pressure ratio accompanying the change of the compressor inlet air pressure where the turbocharger speed is maintained constant (for example, $NT_{MAX}$). Where the turbocharger speed is maintained constant, as mentioned above, the compressor pressure ratio rises as the compressor inlet air pressure (atmospheric pressure PA in the present embodiment) becomes lower.

Next, a case where the compressor inlet air temperature is lowered will be considered. In the compressor, the lower the inlet air temperature, the more the compression efficiency is improved. For this reason, if the other compressor inlet conditions are the same, the lower the inlet air temperature, the higher the compressor pressure ratio at the same speed. Therefore, in order to maintain the turbocharger speed constant, it is necessary to increase the setting of the compressor pressure ratio as the compressor inlet air temperature is lowered.

Figure 7:
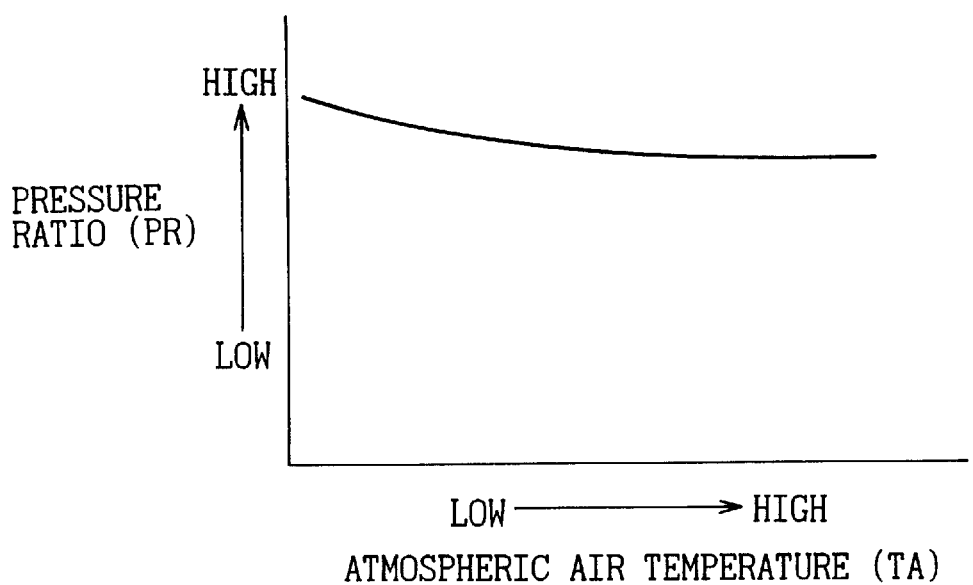
FIG. 7 is a diagram explaining the change of the compressor pressure ratio due to a change of the compressor inlet air temperature.

FIG. 7 is a view of the change of the pressure ratio accompanying the change of the compressor inlet air temperature where the turbocharger speed is maintained constant (for example $NT_{MAX}$). Where the turbocharger speed is maintained constant, as mentioned above, the compressor pressure ratio rises as the compressor inlet air temperature (atmospheric temperature TA in the present embodiment) becomes lower.

In the present embodiment, the supercharging pressure control for controlling the compressor pressure ratio is carried out by using the relationship of FIG. 5 to FIG. 7. Below, an explanation will be made of the concrete control of the supercharging pressure of the present embodiment.

Note that, when the flying altitude is increased, the atmospheric pressure (compressor inlet air pressure) and the atmospheric temperature (compressor inlet air temperature) are lowered in accordance with the altitude. In curves I to III of FIG. 3(C), the explanation was made of the turbocharger speed according to the altitude where the engine intake temperature (intercooler 8 outlet temperature) was constant. But in actual operation, if the pressure ratio is controlled constant, as shown in curves I to III of FIG. 3(C), there is a tendency to cause a phenomenon where the turbocharger speed is lowered along with an increase of the altitude.

Figure 8:
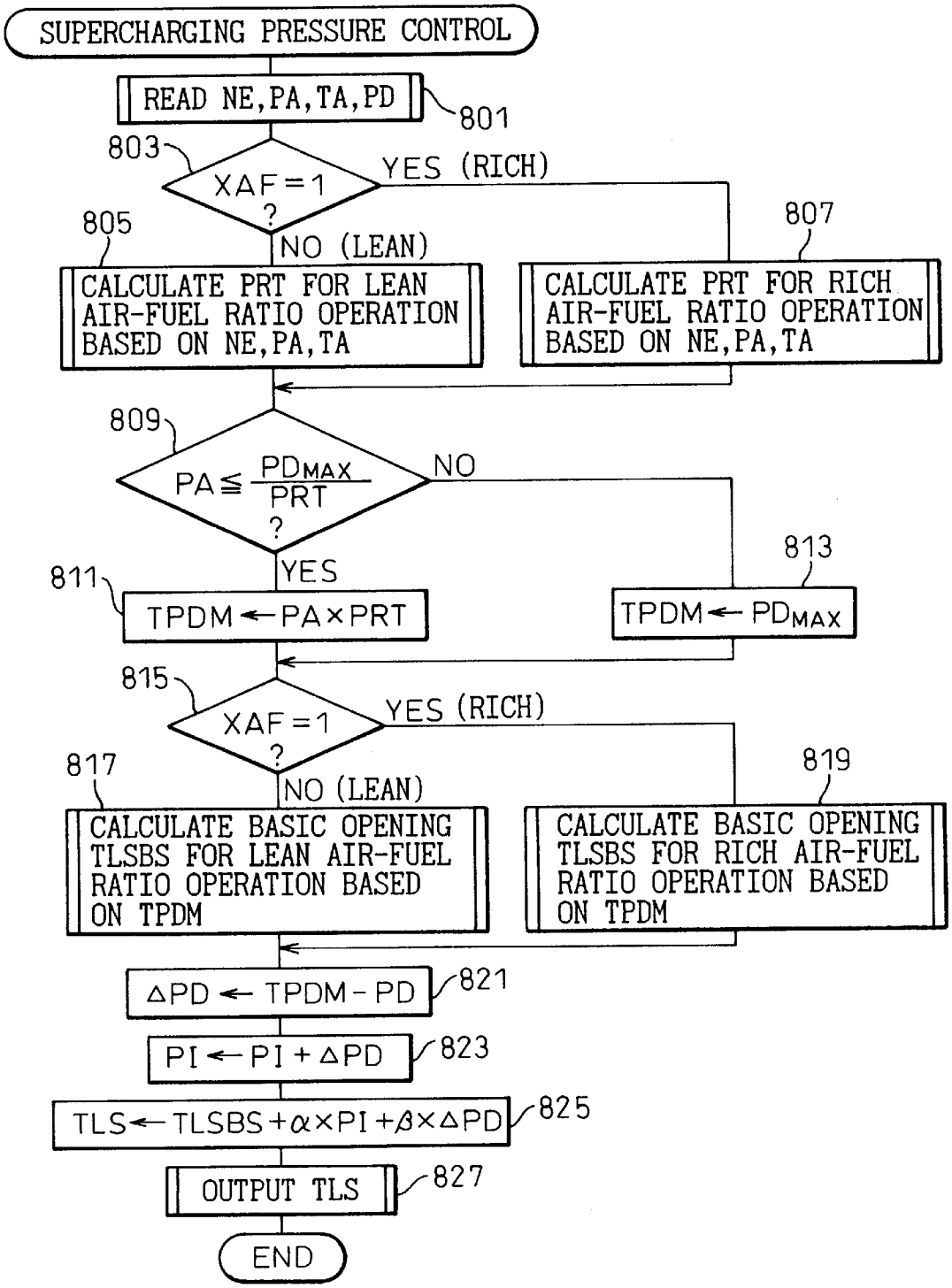
FIG. 8 is a flowchart explaining an example of the supercharging pressure control operation according to the present invention.

FIG. 8 is a flowchart explaining the control of the supercharging pressure of the supercharging pressure control device of FIG. 1. The present routine is executed at every predetermined time interval by the EEC 30.

In FIG. 8, when the routine starts, at step 801, the engine speed NE, atmospheric pressure PA, atmospheric temperature TA, and the deck pressure PD detected at the NE sensor 32, the PA sensor 36, the TA sensor 37, and the PD sensor 34, respectively, are read and fetched.

Subsequently, at step 803, it is decided from the value of the flag XAF whether or not the current engine is operated with a rich air-fuel ratio. Here, XAF is a flag set by a fuel injection amount operation routine (not shown) separately executed. Where the engine is operated with a rich air-fuel ratio, XAF is set to 1, and when the engine is operated with a lean air-fuel ratio, XAF is set to 0. Further, at step 805 and step 807, the target value PRT of the pressure ratio PR of the compressor 16 is set. Step 805 indicates the setting operation of the pressure ratio target value PRT where the value of the flag XAF is 0, that is, the engine 1 is currently operated with a lean air-fuel ratio. At step 805, based on the turbocharger operating condition of the engine speed NE, the compressor inlet air pressure PA, and the compressor inlet air temperature TA read and fetched at step 801, the pressure ratio target value PRT at the lean air-fuel ratio operation is set.

The target pressure ratio PRT is the pressure ratio for maintaining the turbocharger speed NT at a constant speed substantially equal to the maximum allowable speed $NT_{MAX}$ and is determined based on the relationship shown in FIG. 5 to FIG. 7. Namely, in the present embodiment, the pressure ratio necessary for maintaining the turbocharger at the maximum allowable speed $NT_{MAX}$ is found in advance by actual measurement under conditions where the combination of the engine speed NE, the compressor inlet air pressure PA, and the compressor inlet air temperature TA is changed during the lean air-fuel ratio operation and during the rich air-fuel ratio operation of the engine by using an actual engine. Further, this pressure ratio is stored in advance in the ROM of the EEC 30 as a function of NE, PA, and TA in accordance with whether the engine air-fuel ratio is lean or rich. At step 805, based on the values of the current turbocharger operating conditions NE, PA, and TA, the pressure ratio target value PRT at the lean air-fuel ratio operation is calculated from the above function at the lean air-fuel ratio operation.

Note that, in the present embodiment, the throttle valve opening TH and the engine speed NE are simultaneously set by the operation of the power lever, therefore the engine intake air amount is represented by a function of only NE. For this reason, in the present embodiment, the pressure ratio is set by using the engine speed as the parameter representing the engine intake air amount. However, in the case of an engine which separately controls the throttle valve opening TH and the engine speed NE, it is also possible to detect the throttle valve opening TH or intake pipe pressure PM other than the engine speed NE and calculate the engine intake air amount and determine the pressure ratio based on them.

Where the flag XAF=1 at step 803, that is, where the engine is currently operated with a rich air-fuel ratio, at step 807, the pressure ratio target value PRT at the rich air-fuel ratio operation is calculated from the function at the rich air-fuel ratio operation stored in the ROM. Namely, at steps 803 to 807, from the turbocharger operating conditions of the engine air-fuel ratio and the engine speed NE, the compressor inlet air pressure PA and the compressor inlet air temperature TA, the target value PRT of the compressor pressure ratio required for operating the turbocharger near the maximum allowable speed $NT_{MAX}$ under these operating conditions is set.

Subsequently, at step 809, by using the pressure ratio target value PRT and constant value $PD_{MAX}$ set from above, it is decided whether or not the current compressor inlet air pressure PA is smaller than $PD_{MAX}/PRT$.

Here, $PD_{MAX}$ is the maximum allowable pressure of the compressor outlet air (maximum allowable deck pressure). Namely, at step 809, where the turbocharger is operated at a target pressure ratio PRT set at step 805 or 807, it is decided, based on the current compressor inlet air pressure PA, whether or not the compressor outlet air pressure exceeds the maximum allowable pressure. At step 809, where $PA \leq (PD_{MAX}/PRT)$, that is, where it is decided that the deck pressure does not exceed the maximum allowable deck pressure $PD_{MAX}$ even if the engine is operated at the pressure ratio setting target value PRT, the control target value TPDM of the deck pressure is found at step 811 as TPDM=PA×PRT from the pressure ratio target value PRT and the compressor inlet air pressure PA.

On the other hand, where $PA>(PD_{MAX}/PRT)$ at step 809, that is, where the engine is operated with the current compressor inlet air pressure PA and the pressure ratio target value PRT set at steps 805 and 807, where it is decided that the deck pressure exceeds the maximum allowable deck pressure $PD_{MAX}$, the control target value TPDM of the deck pressure is set to the maximum allowable deck pressure $PD_{MAX}$ at step 813.

Namely, at steps 809 to 813, where the current atmospheric pressure becomes larger than the predetermined value determined from the pressure ratio target value PRT, the turbocharger control by the compressor pressure ratio is prohibited, and the constant deck pressure control for controlling the deck pressure to the maximum allowable pressure is carried out.

Steps 815 to 827 show the WGV opening control for controlling the opening of the waste gate valve (WGV) 26 so as to obtain the deck pressure control target value TPDM set by the above description.

In the present embodiment, in order to make the deck pressure PD converge to the target value TPDM with a good response and correctly, control combining a feed forward control (open loop control) based on the target value TPDM and feedback control (integration and proportional control) based on the deviation between the target value TPDM and the actual deck pressure PD is carried out and the opening command signal TLS is output to the actuator 25 of the WGV 26. The actuator 26 drives the WGV 26 to the opening in proportion to the command signal TLS, therefore the actual deck pressure immediately converges to the target value TPDM.

Namely, at step 815, it is decided again whether the current engine operating air-fuel ratio is rich or lean, and at steps 817 and 819, the WGV basic opening TLSBS corresponding to the deck pressure target value TPDM is determined in accordance with whether the engine operating air-fuel ratio is rich or lean. As the value of the TLSBS, approximate values are stored in advance in the ROM of the EEC 30 in accordance with whether the engine operating air-fuel ratio is rich or lean as a numerical table using the TPDM. At steps 817 and 819, the basic opening TLBS of the WGV is sought from this numerical table.

Subsequently, at step 821, the deviation ΔPD (ΔPD= TPDM−PD) of the actual deck pressure PD read and fetched at step 801 from the target value TPDM is calculated, and at step 823, the integrated value PI of the deviation ΔPD is calculated as PI=PI+ΔPD.

Then, at step 825, the value of the opening command signal TLS to the actuator 25 of the WGV 26 is calculated as TLS =TLSBS+α×PI+β×ΔPD, and at step 827, this TLS is output to the driving circuit of the actuator 25.

At step 825, α and β are coefficients of the constant values which are determined in advance. Namely, the value of the opening command signal TLS is given as a sum of the feed forward terms (α×PI, β×ΔPD) determined according to the integration and proportional control.

According to the routine of FIG. 8, in the region not above the critical altitude where the speed of the turbocharger does not reach the maximum allowable speed, the deck pressure is controlled to the maximum allowable deck pressure $PD_{MAX}$ (steps 813, 815), and in the region above the critical altitude, the pressure ratio of the compressor is controlled so that the turbocharger speed always becomes near the maximum allowable speed $NT_{MAX}$. For this reason, in accordance with the operating conditions of the turbocharger, the deck pressure of the maximum limit can be always obtained.

Note that, in the embodiment of FIG. 8, the pressure ratio target value PRT of the compressor is calculated by using all of the engine speed NE, the compressor inlet air pressure PA, the compressor inlet air temperature TA, and the engine air-fuel ratio, but it is not always necessary to set the pressure ratio target value by using all of the operating parameters. It is also possible to simply set the pressure ratio target value PRT by using one or a combination of two or more elements from among those described above.

As explained above, according to the present invention, by changing the pressure ratio in accordance with the operating condition of the supercharger, a reduction of speed of the supercharger is prevented and it becomes possible to always obtain the maximum supercharging pressure in accordance with the operating condition.

We claim:

1. A supercharging pressure control device comprising:
   a supercharger having a compressor for raising the pressure of air;
   pressure ratio controlling means for controlling the pressure ratio of an outlet air and an inlet air of the compressor of the supercharger so that the pressure ratio becomes a predetermined pressure ratio setting;
   supercharging parameter detecting means for detecting a supercharging parameter representative of an operating condition of the supercharger; and
   pressure ratio setting changing means for changing the pressure ratio setting of the pressure ratio control means in accordance with the value of the detected supercharging parameter so that the supercharger speed is maintained near a maximum allowable speed for the supercharger under all operating conditions.

2. A supercharging pressure control device as set forth in claim 1, wherein said supercharger supplies air raised in pressure by said compressor to an engine and wherein the supercharging parameter detecting means detects engine operating parameters and determines an intake air amount of the compressor as the supercharger parameter based upon the engine operating parameters.

3. A supercharging pressure control device as set forth in claim 1, wherein the supercharging parameter detecting means detects at least one of the intake air pressure and intake air temperature of the compressor as the supercharging parameter.

4. A supercharging pressure control device as set forth in claim 1, wherein said supercharging parameter detecting means detects an engine operating condition parameter representative of the operating condition of an internal combustion engine as the supercharging parameter.

5. A supercharging pressure control device as set forth in claim 4, wherein the supercharger is an exhaust gas turbocharger and wherein the engine operating condition parameter includes at least one of the speed of the internal combustion engine and the engine operating air-fuel ratio.

6. A supercharging pressure control device as set forth in claim 1, further comprising inlet air pressure detecting means for detecting the compressor inlet air pressure and prohibiting means for prohibiting the pressure ratio controlling means from controlling the pressure ratio of the supercharger when the inlet air pressure exceeds a predetermined value.

* * * * *